Dec. 13, 1966    A. C. OAKES ETAL    3,290,973
GLASS CUTTING APPARATUS
Original Filed Feb. 15, 1960    3 Sheets-Sheet 1

INVENTORS
WAYNE OAKES, DECEASED,
BY BERNADETTE OAKES, EXECUTRIX.
ALFRED C. OAKES
AND CHARLES HATFIELD

Dec. 13, 1966  A. C. OAKES ET AL  3,290,973
GLASS CUTTING APPARATUS

Original Filed Feb. 15, 1960  3 Sheets-Sheet 2

FIG. 4

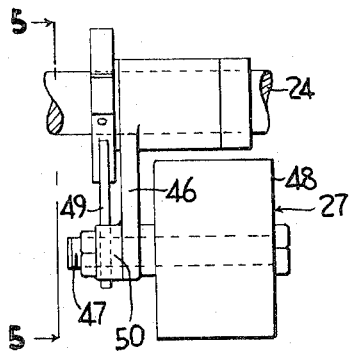

FIG. 5

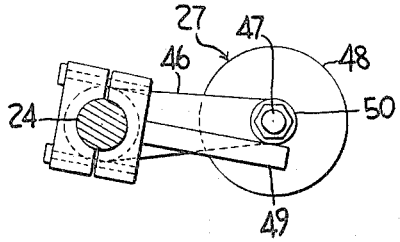

FIG. 7
LEGEND

| ILLUSTRATIVE REFERENCE CHARACTER | SYMBOL | TYPE OF UNITS |
|---|---|---|
| CR1 | —◯— | COIL OF RELAY |
| TCR1 | —◯— | COIL OF TIMER RELAY |
| CR1-1 | —│ │— | NORMALLY OPEN CONTACT OF RELAY |
| CR1-1 | —╫— | NORMALLY CLOSED CONTACT OF RELAY |
| TCR1-1 | | NORMALLY OPEN CONTACT OF TIMER RELAY, BUT TIME OPENING UPON ENERGIZATION OF COIL OF TIMER RELAY |
| LS1 | | NORMALLY OPEN, TRIPPED CLOSED, LIMIT SWITCH |
| PB1 | | NORMALLY OPEN PUSH-BUTTON SWITCH |
| PB1 | | NORMALLY CLOSED PUSH-BUTTON SWITCH |
| SW1 | | PUSH-BUTTON TYPE OF SELECTOR SWITCH WITH TWO CONTACTS IN DIFFERENT CIRCUITS AND WITH ONE CONTACT CLOSED WHEN THE OTHER IS OPEN (SWITCH IN TWO POSITIONS SHOWN) |
| SV1 | —◯— | SOLENOID OF SOLENOID-OPERATED VALVE |

INVENTORS
WAYNE OAKES, DECEASED,
BY BERNADETTE OAKES, EXECUTRIX.
ALFRED C. OAKES
AND CHARLES HATFIELD

United States Patent Office 3,290,973
Patented Dec. 13, 1966

3,290,973
GLASS CUTTING APPARATUS
Alfred C. Oakes and Charles Hatfield, Mount Vernon, Ohio, and Wayne W. Oakes, deceased, late of Mount Vernon, Ohio, by Bernadette Oakes, executrix, Mount Vernon, Ohio, assignors to Pittsburgh Plate Glass Company, Allegheny County, Pa., a corporation of Pennsylvania
Continuation of application Ser. No. 8,549, Feb. 15, 1960. This application Jan. 21, 1965, Ser. No. 427,543
12 Claims. (Cl. 83—11)

This application is a continuation of our prior filed copending application Serial No. 8,549, filed February 15, 1960, now abandoned.

This invention relates to a glass cutting apparatus and more specifically relates to an apparatus for cutting or merely scoring a glass sheet along a number of parallel lines which are normal to an edge of the sheet.

In the apparatus of the present invention a glass sheet is moved by a conveyor under a bridge supporting a number of glass cutter wheels which provide parallel score lines. The apparatus further includes a mechanism that shifts the glass sheet, if necessary, on the moving conveyor prior to the passage of the glass sheet under the cutter wheels to place the leading edge of the sheet normal to the travel of the moving. The apparatus of this invention also includes a mechanism that maintains the leading edge of the sheet normal to the path of travel which is provided by the conveyor during the movement of the glass sheet under the cutter wheels.

It is an object of the present invention to provide an apparatus for providing parallel score lines on a moving glass sheet normal to the leading edge of the glass sheet regardless of the initial angular disposition of the leading edge of the moving sheet with respect to the direction of path of travel.

It is a further object of this invention to provide an apparatus for the shifting of a moving glass sheet prior to the passage of the sheet under cutter wheels.

It is still a further object of this invention to provide an apparatus having a mechanism which automatically shifts the glass sheet on a conveyor until its leading edge is normal to the path of travel provided by a conveyor and which then automatically moves out of the way and permits a device to hold the shifted sheet in this alignment for passage by the conveyor under cutter wheels to provide parallel score lines.

It is another object of the present invention to provide an apparatus for shifting a moving glass sheet to align its leading edge normal to the path of travel, which is provided by the conveyor, and automatically for removing the sheet-shifting mechanism simultaneously with the lowering of a mechanism to insure that the sheet is maintained in this shifted position during its subsequent passage under cutter wheels that provide parallel score lines.

These and other objects of this invention will be apparent to one skilled in the art from the description which follows of a preferred embodiment of the apparatus taken along with the drawings in which similar parts are generally designated by the same numeral and in which:

FIG. 4 is a front elevation of that portion of the apparatus shown in FIG. 3;

FIG. 5 is a fragmentary cross section taken along line 5—5 of FIG. 4;

FIG. 7 is a legend identifying the symbols used in the electrical circuitry of FIG. 6.

Figure 2:
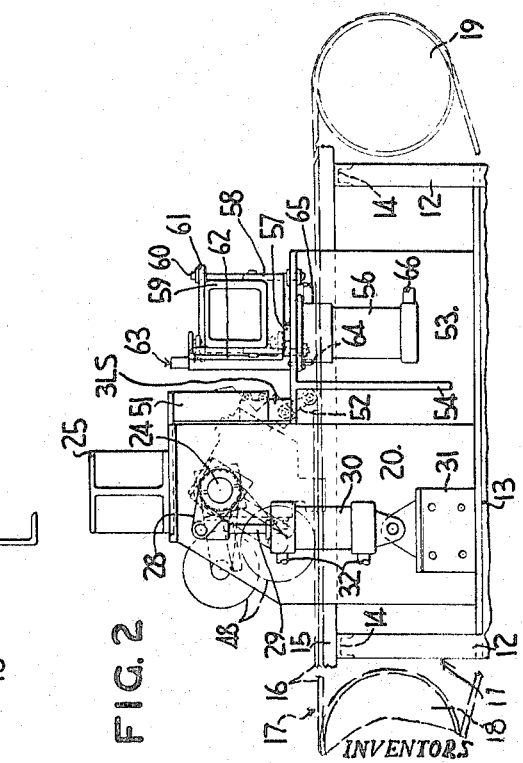
FIG. 2 is a front elevation of the apparatus.

The apparatus of the preferred embodiment as seen in FIG. 2 has a supporting structure generally indicated at 11 including sets of uprights 12 and pairs of horizontal channel irons 13 mounted on uprights 12. The supporting structure 11 includes transverse channel irons 14 which support a number of table sections 15. Belts 16 of a conveyor generally indicated at 17 are supported at their top run by table sections 15. The conveyor 17 has a pulley 18 and a pulley 19 for each belt 16. The pulleys 18 and 19 are mounted on shafts (not shown) and one of the shafts is driven through conventional chains and sprockets (not shown) by a motor (not shown).

A pair of flanged brackets 20 is mounted on the front and rear of supporting structure 11. A gusset 21 having a top flange 22 is mounted on each bracket 20. Bearings 23 that rotatably support a shaft 24 are mounted on flanges 22. Also mounted on brackets 20 is an I-beam 25 connected at its ends to brackets 20.

A pair of stop members, each generally indicated at 26, which are spaced a substantial distance from each other, is keyed on shaft 24. Also mounted on shaft 24 is a number of holddown members generally indicated at 27.

Figure 1:
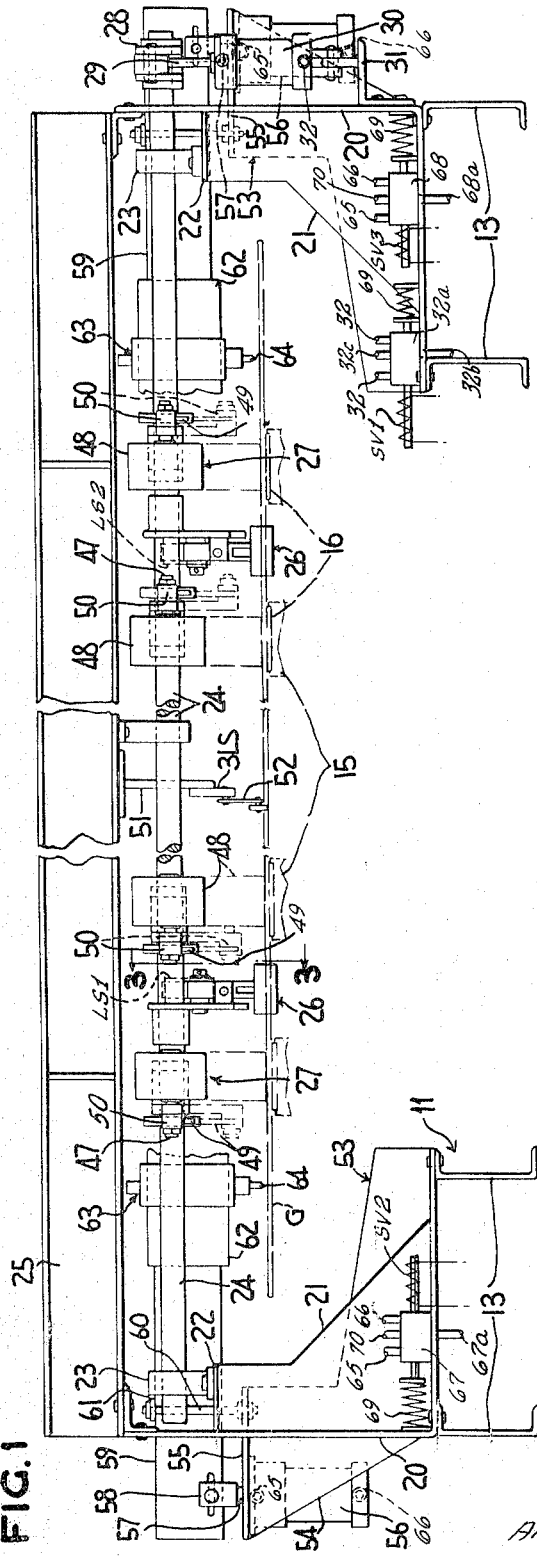
FIG. 1 is a fragmentary side elevation, partly broken away, of the apparatus with only a portion of the conveyor being shown in phantom and with the spaced stop members and holddown members of the apparatus shown in full lines in their first position and in phantom lines in their second position.
Figure 3:
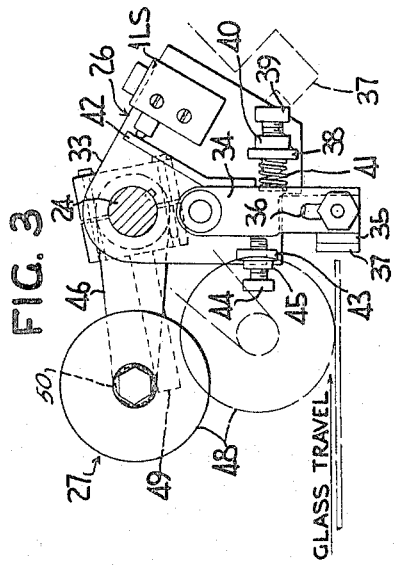
FIG. 3 is a fragmentary cross section taken along line 3—3 of FIG. 1.
Figure 6:
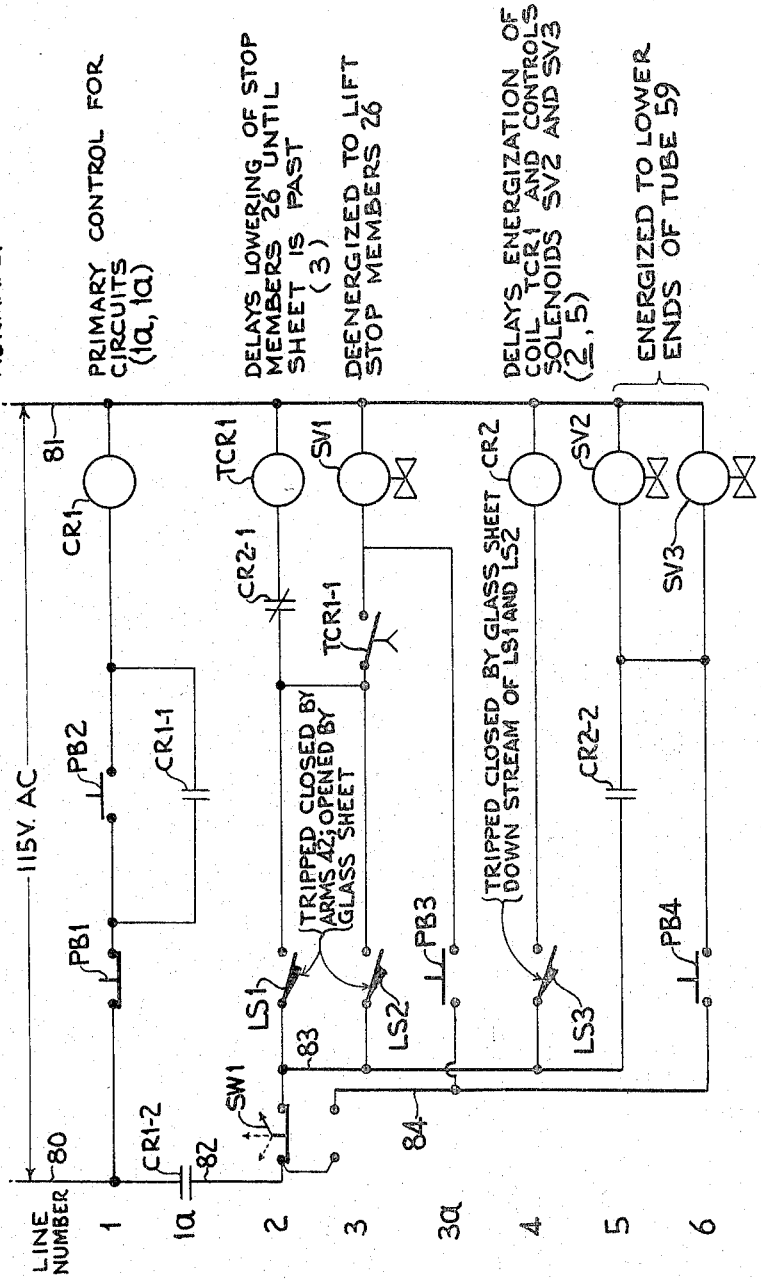
FIG. 6 is a schematic drawing of electrical circuitry used in the apparatus.

A clevis 28 is keyed on one end of shaft 24. The end of a piston rod 29 of an air cylinder 30 is pivotally connected to clevis 28. The air cylinder 30 is mounted on a bracket 31 on one of brackets 20. The operation of air cylinder 30 to extend or retract rod 29 results in rotation of shaft 24. The air cylinder 30 is connected by upper and lower hoses 32 to a solenoid-operated, spring-biased, 4-way valve 32a having a solenoid SV1 (FIG. 6). The valve 32a is connected by a hose 32b to a pressurized air source (not shown). When solenoid SV1 is energized it moves the spool of valve 32a to a first position so that the air source communicates with the lower chamber of air cylinder 30 through hose 32b, valve 32a and lower hose 32 whereby rod 29 is in the extended position so that stop members 26 are positioned as shown in FIGS. 1 through 3. The upper chamber of air cylinder 30 through upper hose 32, valve 32a and an exhaust hose 32c communicates with the atmosphere.

Each stop member 26 has a bracket 33 keyed on shaft 24. On one of brackets 33 is mounted a limit switch LS1. On the other bracket 33 is mounted a limit switch LS2. On each of brackets 33 is pivotally mounted a lever 34. On the free end of lever 34 is mounted a T member 35 which has its leg bolted to lever 34. Vertical adjustment of T member 35 is possible because of slot 36 in lever 34 for the bolt. On the face of T member 35 is mounted by adhesive a member 37 of a synthetic resin, such as polyurethane, which is primarily rigid but which yields to a slight degree. When one of stop members 26 is moved slightly the associated limit switch, LS1 or LS2, senses this movement as described in the next paragraph.

A bracket 38 is mounted on bracket 33. A spring bolt 39 is threaded in bracket 38 and is fixed in position by a nut 40. A spring 41 is mounted on bolt 39 and extends into a recess in lever 34. A trip arm 42 is mounted on lever 34. The spring 41 biases lever 34 so that trip arm 42 engages the corresponding one of switches LS1 and LS2, which are of the normally open type. When each of levers 34 is in the position shown in FIG. 3, trip arms 42 close switches LS1 and LS2. Another bracket 43 is mounted on each of brackets 33. A bolt 44 is threaded through bracket 43 and its position is secured by nut 45. The bolt 44 serves as a stop member for lever 34. The bolt 44 limits the counterclockwise direction (as viewed in FIG. 3) of pivotal movement of lever 34.

A glass sheet G on conveyor 17 is moved from left to right (as viewed in FIGS. 2 and 3). When the leading edge of sheet G reaches one of stop members 26, it abuts member 37. The drive for conveyor 17 is continuous. Thus sheet G moves one of levers 34 counterclockwise against spring 41 thereby moving trip arm 42 away from the appropriate one of switches LS1 and LS2. This switch opens.

As explained later with reference to the electrical circuitry, when both of trip arms 42 are moved away from switches LS1 and LS2 by portions of the leading edge of sheet G pushing against stop members 26 so that solenoid SV1 is deenergized, cylinder 30 is operated to retract rod 29 thereby rotating shaft 24. This pivots brackets 33 in a counterclockwise direction (as viewed in FIGS. 2 and 3). As levers 34 are moved upwardly during this pivotal movement, sheet G can be moved by conveyor 17. When members 37 are sufficiently above sheet G, springs 41 return levers 34 to their normal relationship with respect to brackets 33 which continue to be pivotally moved. Thus as brackets 33 are being pivoted upwardly, the return movement of levers 34 relative to brackets 33 results in trip arms 42 engaging and opening switches LS1 and LS2.

Each of the holddown members 27 includes a lever 46 journaled on shaft 24, a stub shaft 47 on lever 46, a roll 48 journaled on shaft 47 and a lifting arm 49 fixed on shaft 24. The length of lifting arm 49 is sufficient to abut a stub tube 50 welded on the free end of lever 46 to assist in the support of shaft 47.

When shaft 24 is in the position shown in full lines in FIGS. 1 through 3, lifting arm 49 supports lever 46 in the raised position whereby felt-covered roll 48 is substantially above the path of travel of glass sheet G.

When shaft 24 is rotated to life brackets 33 thereby pivoting stop members 26 out of the path of travel of sheet G, lifting arms 49 are pivoted counterclockwise. Because of force of gravity levers 46 and rolls 48 fall until rolls 48 contact sheet G. The weight of rolls 48 maintains their contact with the top surface of glass sheet G now being moved by conveyor 17. This construction is preferred to one in which levers 46 would be keyed on shaft 24 and in which lifting arms 49 would be unnecessary.

After the passage of sheet G, air cylinder 30 is operated, as explained below with reference to the electrical circuitry, to extend rod 29 whereby stop members 26 are lowered. During this rotation of shaft 24 lifting arms 49 are moved clockwise. The moving arms 49 engage stub tubes 50 to lift rolls 48 out of the path of travel of the next glass sheet G.

A downwardly extending bracket 51 is mounted on I-beam 25. The bracket supports a limit switch LS3 which has its roller-containing lever arm 52 positioned so that switch LS3 is tripped closed from its normally open position by the leading edge of glass sheet G. The switch LS3 remains closed until sheet G has completely passed.

A flanged support bracket 53 is mounted on each of the front and rear pair of horizontal channel irons 13. Each of the brackets 53 has a gusset 54. A plate 55 is mounted on each of brackets 53. An air cylinder 56 is supported by each of plates 55. Each cylinder 56 has a piston rod 57 extending upwardly through an opening in plate 55. The end of rod 57 is threaded into a U-shaped bracket 58. A square tube 59 extends transversely of the apparatus above and entirely across conveyor 17 and tube 59 is bolted near its ends to brackets 58. Thus tube 59 is supported by and is raised and lowered by air cylinders 56.

A pair of vertical spaced rods 60, threaded at each end, is mounted on plate 55. Stop members 61 are supported on tube 59. The upper ends of rods 60 extend through members 61 and nuts on rods 60 limit the upward travel of tube 59 provided by cylinders 56.

A plate 62 is mounted on the upstream vertical face of tube 59 (as seen in FIGS. 1 and 2). Cutter assemblies generally indicated at 63 are supported by plate 62. The cutter assemblies 63 may be one of numerous types of construction well known in the art. In the construction shown in FIGS. 1 and 2 the cutter assemblies 63 can be moved transversely of the path of travel of glass sheet G to position each cutter wheel 64 of each of cutter assemblies 63 at different positions to provide different possibilities of score lines in sheet G parallel to the direction of travel of sheet G under cutter assemblies 63.

In this embodiment of the apparatus cutter wheels 64 are above sheet G when piston rods 57 are in their extended positions. The air cylinders 56 are connected by hoses 65 and 66 to solenoid-operated, spring biased, 4-way valves 67 and 68 which are connected by hoses 67a and 68a, respectively, to the pressurized air source. The valves 67 and 68 have solenoids SV2 and SV3, respectively. When solenoids SV2 and SV3 are deenergized, a spring 69 for each of valves 67 and 68 has the spool in a first position so that piston rods 57 are in the extended position.

When solenoids SV2 and SV3 are energized, the spools of valves 67 and 68 are moved to a second position for the operation of air cyliders 56 to retract piston rods 57 thereby lowering cutter assemblies 63 to a position in which their cutter wheels 64 are in scoring position on glass sheet G. As explained below, the energization of coils SV2 and SV3 occurs after switch LS3 is tripped closed by the leading edge of glass sheet G.

It is apparent from the drawings and the foregoing description that a glass sheet placed no conveyor 17 at its left-hand portion, i.e., on conveyor 17 upstream of stop members 26, is moved until two spaced portions of the leading edge of sheet G both abut members 37 mounted on levers 34 and pivot both of levers 34 a sufficient amount to remove trip arms 42 away from switches LS1 and LS2.

If the leading edge of sheet G is angularly disposed relative to a vertical plane normal to the path of travel of sheet G provided by conveyor 17, the one portion of the leading edge will first abut one of members 37 when the other portion of the leading edge will be spaced from other member 37. The conveyor 17 continues to provide a forward force to sheet G. The lever 34 having member 37 in contact with the leading edge is pivoted a slight amount by sheet G to remove arm 42 from switch LS1. Further pivotal movement of lever 34 is prevented by bolt 39. The moving force provided by conveyor 17 continues so that sheet G is shifted until the other portion of the leading edge of sheet G abuts other stop member 26 for disengagement of its arm 42 from the associated limit switch. When this happens, both abutting portions of the leading edge are and thus the entire straight leading edge is normal to the path of travel of sheet G afforded by conveyor 17.

Through the operation of cylinder 30 shaft 24 rotates to move stop members 26 away from their position that hinders further movement of sheet G by conveyor 17. At the same time arms 49 are pivoted by rotation of shaft 24 so that through gravity rolls 48 descend onto sheet G which is again being moved by conveyor 17. The rolls 48 maintain the orientation of sheet G so that its leading edge is maintained normal to the path of travel of sheet G. This maintenance of orientation of the leading edge of sheet G continues until the trailing edge of sheet G passes beyond rolls 48. Before this occurs a substantial portion, usually a major portion, of sheet G has already passed under lowered cutter wheels 64 which are positioned by supporting tube 59 merely a short distance downstream of the lowered position of rolls 48.

It is seen from the foregoing description and the immediately preceding paragraph that sheet G placed on conveyor 17 is passed under cutter wheels for parallel scoring in a direction along the path of travel afforded by conveyor 17 with the parallel scoring lines being normal to the leading edge of sheet G. This is insured by the apparatus without any requirement that the sheet be placed on the feeding end of conveyor 17 so that its leading edge is normal to the path of travel of the top run of conveyor 17. Thus the apparatus provides a "squaring" of the leading edge relative to the path of travel and maintains this squareness for the scoring operation that follows.

Quite often glass sheets are placed on conveyors with the leading edge being disposed in a vertical plane that is other than normal to the path of travel of the top run of conveyor 17. For example, glass sheets are obtained from a vertically moving ribbon of glass in a drawing operation by scoring and snapping the vertical glass ribbon and then laying the newly formed sheet by a conventional laydown conveyor onto a horizontal conveyor. In the present invention the latter conveyor could be conveyor 17.

Referring to FIG. 6, electrical lines 80 and 81 are connected to a 115-volt A.C. source. A first circuit is connected to lines 80 and 81 and includes a coil CR1 of a relay in series with a normally closed push-button switch PB1 and a normally open push-button switch PB2. The relay having coil CR1 has normally open contacts CR1–1 and CR1–2. The contact CR1–1 is in parallel with switch PB2 and in series with switch PB1 and coil CR1. The contact CR1–1 provides a holding circuit for coil CR1 in the following manner. An operator momentarily closes switch PB2 to energize coil CR1 thereby closing contacts CR1–1 and CR1–2. When switch PB2 is opened, contact CR1–1 maintains coil CR1 energized until an operator opens switch PB1.

The other circuits of FIG. 6 are connected by line 82 to line 80 through contact CR1–2 which is closed when coil CR1 is energized. These circuits are connected through contact CR1–2 to line 80 by a 3-position selector switch SW1. In a first position, as shown in FIG. 6, switch SW1 connects electrical line 83 to line 82 whereas in a second position switch SW1 connects an electrical line 84 to line 82. In a third position, switch SW1 connects neither one of lines 83 and 84 to line 82.

A coil TCR1 of a time-delay relay is in series with a normally closed contact CR2–1 and limit switch LS1 of the normally open type in a circuit between lines 81 and 83. The limit switch LS2 of the normally open type is in parallel with switch LS1 and in series with contact CR2–1 and coil TCR1. The switch LS1 is tripped closed by arm 42 when lever of stop member 26 associated with switch LS1 is in the position to be abutted by the glass as shown in FIG. 3. When a portion of the leading edge of glass sheet G being moved on conveyor 17 abuts stop member 26, sheet G moves lever 34 to the right (as viewed in FIG. 3) to move arm 42 away from switch LS1 whereby the latter opens. The switch LS2 is closed by arm 42 of other stop member 26 in the position shown in FIG. 3. Likewise, switch LS2 opens when another portion of the leading edge, spaced substantially from the first portion of the leading edge of the moving sheet on conveyor 17, abuts this stop member 26 and moves lever 34 to the right (as viewed in FIG. 3). Thus with stop members 26 in the position shown in FIG. 3, switches LS1 and LS2 are closed.

If the leading edge of glass sheet G abuts and moves one of levers 34 of stop members 26 ahead of the other lever 34, the associated switch, either LS1 or LS2, opens. This does not deenergize coil TCR1 because the other of switches LS1 and LS2 is still closed. The conveyor 17 continues to move the glass sheet G while sheet G abuts one of the stop members 26 which prevents further movement of this portion of the leading edge. The sheet G shifts until another portion of the leading edge of a sheet G abuts the other stop member 26 and pivots its arms 42 away from the associated other limit switch which opens. When both of switches LS1 and LS2 are open, coil TCR1 is deenergized.

In series with switches LS1 and LS2 in a circuit is solenoid SV1 and a normally open contact TCR1–1 of the time-closing type, i.e., after energization of coil TCR1 of the relay of which it is a part, contact TCR1–1 after a delay closes. The contact TCR1–1 and solenoid SV1 are in parallel with contact CR2–1 and coil TCR1.

The home or normal position of stop members 26 is shown in FIG. 3 so that switches LS1 and LS2 are closed when members 26 are at their home position. Relay TCR1 is energized until a glass sheet moves both stop members 26. Thus contact TCR1–1 is closed until both of switches LS1 and LS2 open to deenergize coil TCR1. The reason for contacts CR2–1 and TCR1–1 in these circuits will be explained later.

In parallel with contact TCR1–1 and switches LS1 and LS2 is a normally open push-button switch PB3 which is in series with solenoid SV1, and this circuit is connected to lines 81 and 84. With switch SW1 in the second position an operator can energize solenoid SV1 by closing switch PB3. The purpose of this circuit will be explained later.

Another circuit between lines 81 and 83 has in series a coil CR2 of a relay, having contacts CR2–1 and CR2–2, and normally open limit switch LS3 which is closed when conveyor 17 moves the leading edge of glass sheet G beyond stop members 26, which are in raised position, and toward glass cutter wheels 64. The coil CR2 remains energized until the trailing edge of glass sheet G passes beyond the limit switch LS3. When this occurs, the lowering of stop members 26 by rotation of shaft 24 will not bring stop members 26 down onto sheet G because it has already passed the "squaring" position.

When solenoid SV1 is deenergized, a spring 69 of 4-way valve 32a of which solenoid SV1 is a part moves the spool of valve 32a to communicate the pressurized air source through hose 32b, valve 32a and upper hose 32 with the upper chamber of cylinder 30 and to communicate the lower chamber of cylinder 30 through lower hose 32, valve 32a and hose 32c with the atmosphere, whereby rod 29 retracts. The shaft 24 rotates counterclockwise (as viewed in FIGS. 2 and 3). When each of stop members 26 is raised above the glass to a position shown in phantom in the lower right portion of FIG. 3, spring 41 of each stop member 26 moves lever 34 clockwise so that arm 42 engages and closes its associated limit switch, either LS1 or LS2. This closing of switches LS1 and LS2 does not result in the energization of coil TCR1 if contact CR2–1 is open. Of course, contact is open if sheet G has closed switch LS3 to energize coil CR2.

Assuming switch LS3 is not closed, coil TCR1 is energized when switches LS1 and LS2 close, but solenoid SV1 cannot be energized until after a delay because the energization of coil TCR1 does not immediately close contact TCR1–1. However, before the end of the delay period of time, contact CRS2–1 opens to deenergize coil TCR1, when sheet G closes switch LS3.

When the trailing edge of glass sheet G passes beyond switch LS3, this switch opens to deenergize coil CR2, thereby closing contact CR2–1 for the energization of coil TCR1. The switches LS1 and LS2 are already closed. After a delay, contact TCR1–1 closes, thereby energizing solenoid SV1. This moves the spool of valve 32a from its other position that air cylinder 30 is operated to extend to rod 29. The shaft 24 is rotated clockwise (as viewed in FIGS. 2 and 3). This lowers stop members 26 to the home position to be abutted by the next glass sheet G and raises holddown members 27 and their rolls 48.

When coil CR2 is energized by the closing of switch LS3, this results in the energization of coils SV2 and SV3 which are in parallel with each other and in series with normally open contact CR2–2 which closed upon the energization of coil CR2. The circuits having contact CR2–2 and solenoids SV2 and SV3 are connected to lines 81 and 83. The energization of solenoids SV2 and SV3 moves the spools of valves 67 and 68, respectively, so that the air source communicates with the upper chambers of cylinders 56 through hoses 67a and 68a, valves 67 and 68 and hoses 65 whereby rods 60 retract to lower cutter wheels 64 and the lower chambers of cylinder 56 communicate through hoses 66, valves 67 and 68 and exhaust hoses 70 to the atmosphere. There is a lag in the operation of air cylinders 56. The lag is adjusted so that the cutter wheels 64 are not lowered to the scoring position until the leading edge of glass sheet G is directly under cutter wheels 64 or slightly beyond this position.

When the trailing edge of sheet G passes beyond switch LS3, the latter opens, thereby deenergizing coil CR2 to open contact CR2–2. This deenergizes solenoids SV2 and SV3. The springs of the associated valves move the spools of the valves to the other position so that the air source now communicates with the lower chambers of cylinders 56 to extend piston rods 60. The cutter wheels 64 are raised after the lag of operation of cylinders 56.

The solenoids SV2 and SV3 are also in series with a normally open push-button switch PB4 which connects solenoids SV2 and SV3 to line 84. When switch SW1 is in its second position so that line 84 is connected to line 80 through switch SW1 and contact CR1–2, the closing of switch PB4 by an operator energizes solenoids SV2 and SV3 to lower cutter wheels 64 to the scoring position. This permits the manual lowering of the cutter wheels instead of automatically lowering them through the closing of switch LS3.

Similarly, with switch SW1 in its second position an operator closes switch PB3 to energize solenoid SV1. The switch PB3 is maintained closed until it is observed that a moving glass sheet G on conveyor 17 abuts both stop members 26. Then the operator opens switch PB3 to deenergize solenoid SV1. This results in the raising of stop members 26 and the lowering of rolls 48 to permit the resumption of movement of glass sheet G with rolls 48 maintaining the squaring initially provided by stop members 26. This permits the operation of the apparatus during any malfunction of switch LS1, switch LS2 or the relay having coil TCR1. The stop members 26 can be lowered only by an operator closing switch PB3 so long as switch SW1 remains in its second position.

With the circuitry described above, it is apparent that the failure of any one of solenoids SV1, SV2 and SV3 does not have an adverse effect on glass sheets G being moved by conveyor 17. The deenergization of solenoid SV1 will automatically result in the raising of stop members 26 out of path of travel of the glass sheets on conveyor 17. The deenergization of solenoids SV2 and SV3 results in the lifting of cutter wheels 64 through the lifting of tube 59. These results are obtained automatically through the circuitry when an operator opens switch PB1 to deenergize coil CR1 for the opening of contact CR1–2.

Modifications of the electrical circuitry will be apparent to one skilled in the art from the description that has been presented. For example, limit switches LS1 and LS2 can be positioned so that they would be closed by arms 42, when levers 34 are pivoted by sheet G to energize solenoid SV1. In this case the solenoid valve having solenoid SV1 would be connected to air cylinder 30 so that, when solenoid SV1 is energized, piston rod 29 is retracted. The modified circuitry would also include circuits so that solenoid SV1 cannot be deenergized for the lowering of stop members 26 until after glass sheet G has entirely passed. For example, contacts of the relay having coil CR2, which is energized by switch LS3, could be utilized in circuits to prevent deenergization of solenoid SV1 until sheet G passes beyond switch LS3. The motor for operating conveyor 17 can be operated through a starter (not shown) having a coil similar to coil CR1. The coil is energized and maintained in the energized state in the same manner as described above for coil CR1. This motor operates continuously to move glass sheet G against stop members 26 and then under cutter wheels 64 as soon as stop members 26 are automatically lifted from the path of travel of sheet G.

Various modifications of the apparatus will be apparent to one skilled in the art from the description of the preferred embodiment presented above and in the drawings. Thus the invention is not to be limited by this description but only by the claims that follow.

We claim:

1. An apparatus for cutting a moving glass sheet along parallel lines normal to the leading edge of the moving sheet which comprises a supporting structure, conveyor means to move a glass sheet in a horizontal path of travel, a pair of sheet-stopping means, said sheet-stopping means being spaced from each other in a vertical plane normal to the horizontal path of travel of the glass sheet, means mounted on the supporting structure to support each of said pair of sheet-stopping means, actuated power means to move said supporting means for said stopping means between a first position and a second position, said support means for said stopping means in the first position supporting said sheet-stopping means in the path of travel of the glass sheet and said support means in the second position supporting said sheet-stopping means above the path of travel, a first sensing means actuated by abutment of the glass sheet against one of said sheet-stopping means, a second sensing means actuated by abutment of the glass sheet against the other of said sheet-stopping means, means to actuate said power means in response to actuation only of both of said first sensing and said second sensing means for movement of said support means from the first position to the second position, cutter wheels, means to support said cutter wheels in position at least to score the glass sheet along lines parallel to the path of travel of the sheet, said wheel-supporting means being mounted on the supporting structure, and means to actuate said power means to move said support means for said stopping means from the second position to the first position.

2. The apparatus of claim 1 and including levers mounted on said support means for said sheet-stopping means, rolls rotatably mounted on said levers, means connected to said support means for said sheet-stopping means to maintain said levers in a first position when said support means for said sheet-stopping means is in the first position whereby said rolls are spaced above the path of travel of the glass sheet, said lever-maintaining means being movable with said support means for said sheet-stopping means from the first position to the second position whereby said levers are in a second position and said rolls are on the glass sheet when said support means for said sheet-stopping means is in the second position.

3. Apparatus of claim 2 wherein said support means for said cutter wheels includes a bridge mounted on the supporting structure above said conveyor means and actuated power means connected to said supporting structure and supporting said bridge for vertical movement between a first position, wherein said cutter wheels are spaced above the path of travel of the glass sheet, and a second position wherein said cutter wheels are in scoring position and said apparatus includes a third sensing means mounted on a supporting structure between said sheet-stopping means and said cutter wheels to be actuated by the leading edge of the glass sheet, said third sensing means actuating said power means for said bridge for movement of said bridge from the first position to the second position.

4. The apparatus of claim 3 wherein the first, second and third sensing means includes limit switches and wherein the power means for the bridge-supporting means includes air cylinders.

5. The apparatus of claim 4 wherein said third sheet-sensing means includes a relay having a contact to prevent said actuating means operating said power means to move said sheet-stopping means from the second position to the first position during abutment of the glass sheet against said third sensing means.

6. An apparatus for cutting a moving glass sheet along parallel lines normal to the leading edge of the moving sheet which comprises a supporting structure, conveyor means to move a glass sheet in a horizontal path of travel, a shaft rotatably mounted on the supporting structure, said shaft being above said conveyor and with its axis of rotation being horizontal and normal to said path of travel of the sheet provided by said conveyor means, a pair of spaced sheet-stopping means mounted on said shaft for pivotal movement about the axis of rotation of said shaft with and upon movement of said shaft about its axis of rotation, actuated power means to move said shaft about its axis of rotation between a first position and a second position, said sheet-stopping means being in the path of travel of the glass sheet when said shaft is in the first position and above the path of travel when said shaft is in the second position, a first sensing means actuated by abutment of the glass sheet against one of said sheet-stopping means, a second sensing means actuated by abutment of the glass sheet against the other of said sheet-stopping means, means to actuate said power means in response to actuation only of both of said first sensing means and said second sensing means for rotation of said shaft from first position to second position, cutter wheels, means mounted on the supporting structure to support said cutter wheels in position at least to score the glass sheet along lines parallel to path of the sheet, and means to actuate said power means to move said shaft from the second position to the first position.

7. The apparatus of claim 6 and including levers rotatably mounted on said shaft, rolls rotatably mounted on said levers, lifting levers keyed on said shaft, said lifting levers engaging said levers rotatably mounting said rolls when said shaft in in the first position whereby said rolls are spaced above the path of travel of the glass sheet, said lifting levers being moved by rotation of said shaft to the second position whereby said rolls are on the glass sheet being moved by said conveyor means.

8. The apparatus of claim 7 wherein each of the pair of spaced sheet-stopping means includes a bracket keyed on said shaft for pivotal movement upon rotation of said shaft, a lever mounted on said bracket for pivotal movement between a first position and a second position about an axis parallel to the axis of the said shaft, a sheet-abutting means mounted on said lever for abutment with the sheet when said shaft is in the first position, means to limit the pivotal movement of said lever from the first position to the second position by the glass sheet, a spring urging the movement of the lever away from the second position toward the first position, and an arm mounted on said lever for pivotal movement with movement of said lever, said first and second sensing means including limit switches mounted on the brackets for engagement by said arms when said levers are at one of said first and second positions of pivotal movement.

9. The apparatus of claim 8 wherein the power means to move said shaft about its axis of rotation includes a lever keyed on said shaft and an air cylinder pivotally mounted on the supporting structure and having a piston rod pivotally connected to said lever of said power means.

10. The apparatus of claim 9 wherein said support means for said cutter wheels includes a bridge mounted on the supporting structure above said conveyor means and actuated power means connected to said supporting structure and supporting said bridge for vertical movement between a first position, wherein said cutter wheels are spaced above the path of travel of the glass sheet, and a second position wherein said cutter wheels are in a scoring position and said apparatus includes a third sensing means mounted on a supporting structure between said sheet-stopping means and said cutter wheels to be actuated by the leading edge of the glass sheet, said third sensing means actuating said power means for said bridge for movement of said bridge from the first position to the second position.

11. The apparatus of claim 10 wherein the third sensing means includes a limit switch and wherein the power means for the bridge-supporting means includes air cylinders.

12. The apparatus of claim 11 wherein said third sheet-sensing means includes a relay having a contact to prevent said actuating means operating said power means to move said sheet-stopping means from the second position to the first position during abutment of the glass sheet against said third sensing means.

References Cited by the Examiner
UNITED STATES PATENTS
2,607,421   8/1952   Anderson _____ 83—372

ANDREW R. JUHASZ, *Primary Examiner.*